United States Patent Office 2,954,356
Patented Sept. 27, 1960

2,954,356

METAL STABILIZERS FOR RUBBER

Dudley B. Merrifield, Charleston, W. Va., assignor to Monsanto Chemical Company, St. Louis, Mo., a corporation of Delaware No Drawing. Filed Oct. 17, 1955, Ser. No. 541,070

9 Claims. (Cl. 260—23.7)

The present invention relates to the manufacture of vulcanized rubber by employing special additives, some in not more than trace amounts, for example 1 part in 10,000 parts by weight of the entire compounded mixture. By the addition of such additives as the oxides of lead and copper and fatty acid rubber soluble salts such as stearates, oleates and palmitates of lead and copper, iodides, or even water soluble salts as the acetates of lead and copper, resistance of the vulcanized rubber compound to degradation by ozone is greatly increased. Preferably, the vulcanization of such a compound is carried out in the absence of free sulfur but by means of a suitable sulfur containing organic compound or alternatively by the combination of such an organic sulfur compound with less than one-half the quantity of free sulfur normally required for the rubber compound in question.

Moreover, in rubber compounds containing carbon black and employing the trace amounts of metals mentioned above, together with the low sulfur and a non-free-sulfur vulcanizing agent or the latter material alone as the vulcanizing means, improved resistance to aging, heat buildup and cut growth result. The improvement is additive, therefore the metals are used to advantage in conjunction with an organic antidegradation agent, as for example phenothiazine, diphenyl-p-phenylenediamine and other p-phenylenediamine derivatives and the dihydroquinolines.

It will then be shown by the examples of the invention set forth hereinafter that a new type positive acting catalyst, present in the compound in only minute quantities, exerts a strong and most desirable influence on the physical properties of the vulcanized rubber stock in which such catalysts are included.

As one example of the present invention, there were mixed in the usual manner, three rubber compounds containing as a base mixture:

100 parts pale crepe rubber
50 parts titanium dioxide
25 parts zinc oxide
15 parts clay
1 part stearic acid and to which base mixture there were added:

| Stock | A | B | C |
|---|---|---|---|
| | Parts by weight | | |
| Sulfur | 3.0 | | |
| Benzothiazyl disulfide | 0.6 | | |
| Diphenyl guanidine | 0.15 | | |
| 4,4'-Dithiodimorpholine | | 3.5 | 3.5 |
| N-Cyclohexyl 2-benzothiazole sulfenamide | | 0.5 | 0.5 |
| Di-tert-amyl hydroquinone | | 1.5 | 1.5 |
| Lead stearate | | | 0.02 |

The several rubber compounds as shown were then vulcanized for 45 and 60 minutes at 144° C. in the usual manner and test portions thereof subjected to various well known tests. The ozone rating was determined by assigning a value of 100 to a stock containing in addition to the ingredients of stock A, 1.5 parts of 6-ethoxy-1,2-dihydro-2,2,4-trimethylquinoline. The following results were obtained:

TABLE I

| Stock | A | B | C |
|---|---|---|---|
| Ozone rating | 75 | 113 | 128 |
| No. hrs. to appearance of first cracks | 12 | 48 | 60 |
| Mooney scorch test @135° C | 14.4 | 22.3 | 24.8 |
| Aged 72 hrs. at 100° C. for the optimum cure of (mins.): Yielded | 45 | 60 | 60 |
| Percent retained tensile | 60 | 77 | 87 |
| Percent retained elongation | 77 | 80 | 79 |
| Percent retained 300% modulus | 105 | 158 | 156 |
| Unaged properties—300% Modulus: | | | |
| 45 mins. @ 144° C | 966 | 856 | 830 |
| 60 mins. @ 144° C | 813 | 813 | 766 |
| Tensile strength at Break: | | | |
| 45 mins. @ 144° C | 3,286 | 3,543 | 3,633 |
| 60 mins. @ 144° C | 3,133 | 3,343 | 3,426 |
| Elongation, percent: | | | |
| 45 mins. @ 144° C | 583 | 600 | 605 |
| 60 mins. @ 144° C | 600 | 573 | 583 |

A study and comparison of the above results demonstrates the advance made by the present invention. All three stocks show similar physical characteristics before aging. Stocks A and B are selected as control stocks. Stock C, containing the catalyst of the present invention, delays the appearance of the first crack and is more resistant to ozone than are stocks A, B and stock A containing an ozone resistant agent. The experimental stock also shows good resistance to normal oven air aging as is demonstrated by the higher percentage of retained physical properties in comparison with the control stocks A and B. Stocks B and C, containing no free sulfur, are superior in scorch properties and ozone resistance to stock A.

The improvement in resistance to cut growth by the employment of a catalyst of the type described by the present invention is demonstrated by the following rubber compounds which were tested on the India flexing machine and the number of cycles to failure determined after first forming the usual slight cut in the test piece. As a base formula for all test stocks there were taken:

100 parts smoked sheet rubber
50 parts carbon black
5 parts zinc oxide
3 parts stearic acid
3 parts paraffin
0.5 part N-cyclohexyl-2-benzothiazole sulfenamide To the above base formula there were also added as indicated below:

| Stock | D | E | F |
|---|---|---|---|
| | Parts by weight | | |
| 4,4'-Dithiodimorpholine | 1.0 | 1.5 | 3.5 |
| Sulfur | 1.0 | 0.8 | |

The three base stocks, additionally containing the other additives and in the quantities shown below, were mixed and vulcanized in the usual manner with the test portion of the size and shape required in the India flexing machine. Results shown below are thousands of flexings required to failure of the test piece:

TABLE II

| Other additive | Stock | | |
|---|---|---|---|
| | D | E | F |
| None | 300 | 300 | 250 |
| Litharge .01 | 400 | 375 | 300 |
| Copper oxide .01 | 400 | 375 | 300 |
| Lead stearate .01 | 425 | 400 | 325 |
| Copper stearate .01 | 425 | 425 | 325 |
| Blend of 85 parts 1,2-dihydro-2,2,4-trimethyl-6-phenylquinoline and 15 parts N,N'-diphenyl-p-phenylenediamine 1.5 | 450 | 425 | 400 |
| Blend of 85 parts 1,2-dihydro-2,2,4-trimethyl-6-phenylquinoline and 15 parts N,N'-diphenyl-p-phenylenediamine 1.5+litharge .01 | 525 | 525 | 525 |
| Blend of 85 parts 1,2-dihydro-2,2,4-trimethyl-6-phenylquinoline and 15 parts N,N'-diphenyl-p-phenylenediamine 1.5+copper oxide .01 | 525 | 525 | 525 |
| Blend of 85 parts 1,2-dihydro-2,2,4-trimethyl-6-phenylquinoline and 15 parts N,N'-diphenyl-p-phenylenediamine 1.5+lead stearate .01 | 550 | 525 | 525 |
| Blend of 85 parts 1,2-dihydro-2,2,4-trimethyl-6-phenylquinoline and 15 parts N,N'-diphenyl-p-phenylenediamine 1.5+copper stearate .01 | 550 | 525 | 525 |
| N-Cyclohexyl-N,N'-dinitroso-N'-phenyl-p-phenylenediamine 1.5 | 625 | 600 | 625 |
| N-Cyclohexyl-N,N'-dinitroso-N'-phenyl-p-phenylenediamine 1.5+litharge .01 | 800 | 775 | 750 |
| N-Cyclohexyl-N,N'-dinitroso-N'-phenyl-p-phenylenediamine 1.5+copper oxide .01 | 800 | 775 | 750 |
| N-Cyclohexyl-N,N'-dinitroso-N'-phenyl-p-phenylenediamine 1.5+lead stearate .01 | 850 | 800 | 750 |
| N-Cyclohexyl-N,N'-dinitroso-N'-phenyl-p-phenylenediamine 1.5+copper stearate .01 | 850 | 800 | 750 |

It is shown above that there is an improvement in resistance to cut growth produced by the presence of trace amounts of the disclosed metallic catalysts and this effect is increased or emphasized by the presence of a standard antioxidant in the compound. The improvement in cut growth resistance, which in the cases reported above represents the arithmetic mean of many stocks run in many experiments, is still further improved by the co-presence in the compound of a nitroso derivative of p-phenylenediamine in place of the standard antioxidant.

Another experiment demonstrating again the improved effect on scorch, cut growth and aging by the practice of the present invention was carried out by mixing the following base formula:

100 parts smoked sheet rubber
50 parts carbon black
5 parts zinc oxide
3 parts paraffin
3 parts stearic acid and adding thereto the following components for the various experimental stocks shown:

| Stock | G | H | J | K | L | M |
|---|---|---|---|---|---|---|
| | parts by weight | | | | | |
| Sulfur | 2.5 | | 1.0 | 1.0 | 1.0 | 1.0 |
| N-Cyclohexyl-2-benzothiazole sulfenamide | 0.5 | 0.5 | 0.5 | 0.5 | 0.5 | 0.5 |
| 4,4'-Dithiodimorpholine | | 3.5 | 1.0 | 1.0 | 1.0 | 1.0 |
| Blend of 85 parts 1,2-dihydro-2,2,4-trimethyl-6-phenylquinoline and 15 parts N,N'-diphenyl-p-phenylenediamine | 1.5 | | | | | |
| N-Cyclohexyl-N,N'-dinitroso-N'-phenyl-p-phenylenediamine | | 1.5 | 1.5 | | 1.5 | |
| Lead stearate | | 0.01 | 0.01 | | | |
| Copper stearate | | | | | 0.01 | |
| Mixture A | | | | 1.51 | | |
| Mixture B | | | | | | 1.51 |

In the above formula mixture A and mixture B are respectively .02 part of lead stearate and .02 part of copper stearate thoroughly premixed together with 1.5 parts of the p-phenylenediamine derivative specified in the above recipe. The six different stocks were milled and vulcanized in the usual manner both as tests sheets and in any special forms required for the special tests carried out. The results obtained are set forth below:

TABLE III

| Stock | G | H | J | K | L | M |
|---|---|---|---|---|---|---|
| Mooney Scorch at 135° C | 10 | 38 | 26 | 26 | 26 | 27 |
| India flexing test at 100° C | 450 | 725 | 750 | 850 | 750 | 850 |
| Heat buildup, degrees | 30 | 23 | 25 | 24 | 24 | 23 |
| Percent retention of elongation after 72 hrs. oven aging at 100° C. (45 min. cure) | 53 | 69 | 71 | 68 | 69 | 75 |

The above results show decreased scorchiness, improved cut growth, less heat buildup and better aging resistance for the five stocks H to M inclusive as compared with the stock G. The presence of trace amounts (1 part in 16,000) of the metallic stearates in the presence of a nitroso substituted phenylenediamine and in a nonsulfur or low sulfur containing stock imparts particularly desirable physical properties to the compound.

Another test was carried out to determine whether premixing together of the metallic catalyst (that is, the lead or copper compound) with the nitrosoamine derivative would yield improved results over the addition of the two materials separately. Accordingly, stock E of the formula set forth hereinbefore was mixed and to this base formula 1.5 parts of N,N'-dinitroso-N,N'-diphenyl-p-phenylenediamine and 0.01 part of the catalyst were added either premixed or separately, with the results shown below after vulcanizing and testing:

TABLE IV

| | Scorch at 121° C., mins. | India Cut Growth, Kilocycles to Failure |
|---|---|---|
| Lead oxide | 50 | 825 |
| Lead oxide premixed | 54 | 850 |
| Copper oxide | 50 | 850 |
| Copper oxide premixed | 54 | 925 |
| Lead acetate premixed | 50 | 700 |
| Copper acetate premixed | 51 | 800 |

Again the beneficial effects of the use of the catalyst are shown and here the results show some advantage to the premixing of the nitroso derivative and the metallic catalyst.

Another test illustrative of the present invention is the following in which was employed as the base formula:

100 parts smoked sheet rubber
50 parts carbon black
5 parts zinc oxide
3 parts stearic acid
3 parts paraffin to which were added for the experimental tests:

| Stock | N | O | P | Q | R |
|---|---|---|---|---|---|
| | Parts by weight | | | | |
| N-Cyclohexyl 2-benzothiazole sulfenamide | 0.5 | 0.5 | 0.5 | 0.5 | 0.5 |
| Sulfur | 1.0 | 1.0 | 1.0 | 1.0 | 1.0 |
| 4,4'-Dithiodimorpholine | 1.0 | 1.0 | 1.0 | 1.0 | 1.0 |
| Lead oxide | | 0.01 | | 0.01 | |
| Copper oxide | | | 0.01 | | 0.01 |
| N,N'-Dinitroso-N,N'-diphenyl-p-phenylenediamine | | | | 1.5 | 1.5 |

The results obtained were as follows:

TABLE V

| | Mins. Cure at 144° C. | Stock | | | | |
|---|---|---|---|---|---|---|
| | | N | O | P | Q | R |
| Percent Retention of Elongation after aging 48 hrs. at 100° C. | 45 | 85 | 86 | 62 | 93 | 99 |
| India cut growth @ 100° C. | 45 | 300 | 375 | 350 | 850 | 900 |
| 300% Modulus | 45 | 2,260 | 2,200 | 2,240 | 2,300 | 2,300 |
| | 60 | 2,190 | 2,010 | 2,050 | 2,170 | 2,330 |
| Tensile strength | 45 | 3,920 | 3,950 | 3,890 | 4,000 | 3,870 |
| | 60 | 3,690 | 3,890 | 3,710 | 3,720 | 3,800 |

Again it is shown that the metallic oxide catalysts improve the base stock and that these metal catalysts are still further increased in effectiveness by the further addition of a nitroso secondary amine compound. The metal catalysts are also used to advantage in conjunction with a combination of a nitroso secondary amine and an aliphatic amine which combination is disclosed in copending application Serial No. 423,118, filed July 19, 1955. Metal catalysts with this combination are especially meritorious for butadiene-styrene copolymer rubber (GR–S).

The metal catalysts also include other heavy metals such as Ba, Hg, Bi and Cd. The preferred concentration of metal catalyst is 0.02 to 0.04% based on the diene hydrocarbon rubber but amounts within the range of 0.01–0.1% give beneficial results. However, amounts above 0.04% are not necessarily more effective and more than about 0.1% may be actually harmful.

The equipment and test procedures employed in the various tests hereinbefore described are those well known and adopted in the art. The scorch test employed the Mooney viscometer and followed procedure A.S.T.M. D1077–49T at 121–135° C. The cut growth results were obtained on the India flexometer and were recorded as kilocycles run to failure of the test piece. The hysteresis data (heat buildup) were obtained on the Goodrich flexometer by procedure A.S.T.M. D623–41T at 175 p.s.i. load, 0.175" stroke, 30/sec. from 100° C. base temperature. The aging test was carried out in the air oven by method A.S.T.M. D573–53 at 100° C.

It is intended to cover all changes and modifications of the invention herein chosen for purposes of disclosure which do not constitute departures from the spirit and scope of the invention.

What is claimed is:

1. A method of producing vulcanized rubber which comprises incorporating into a sulfur vulcanizable hydrocarbon rubber selected from the group consisting of natural rubber and butadiene styrene copolymer rubber in an amount within the range of 0.01%–0.1% based on the rubber hydrocarbon of a free heavy metal compound selected from the group consisting of the oxides, iodides and fatty acid salts of copper, lead, barium, mercury, bismuth, cadmium and mixtures thereof and vulcanizing the mixture in the presence of an amine selected from the group consisting of vulcanizing amount of 4,4'-dithiodimorpholine and antioxidant amounts of phenothiazine, diphenyl p-phenylenediamine, N-cyclohexyl N, N'-dinitroso N'-phenyl p-phenylenediamine, N,N'-dinitroso N,N'-diphenyl p-phenylenediamine, 1,2-dihydro-2,2,4-trimethyl-6-phenylquinoline and mixtures thereof.

2. The method of claim 1 in which the heavy metal compound is copper oxide.

3. The method of claim 1 in which the heavy metal compound is lead oxide.

4. The method of claim 1 in which the free heavy metal compound is 0.01%–0.04% lead oxide.

5. The method of claim 1 in which the heavy metal compound is mixed with the amine as a preliminary step before addition to the rubber.

6. A method of producing vulcanized rubber which comprises incorporating an antioxidant amount of a N,N'-dinitroso N,N'-diphenyl p-phenylenediamine into a sulfur vulcanizable hydrocarbon rubber selected from the group consisting of natural rubber and butadiene styrene copolymer rubber and free lead oxide in an amount within the range of 0.01%–0.04% based on the rubber hydrocarbon and vulcanizing the mixture.

7. A method of producing vulcanized rubber which comprises incorporating into a sulfur vulcanizable hydrocarbon rubber selected from the group consisting of natural rubber and butadiene styrene copolymer rubber, free lead oxide in an amount within the range of 0.01%–0.04% based on the rubber hydrocarbon and as the essential vulcanizing agent 4,4'-dithiodimorpholine and vulcanizing the mixture.

8. The method of claim 1 in which the organic antioxidant is N-cyclohexyl N,N'-dinitroso-N'-phenyl-p-phenylenediamine.

9. The vulcanized rubber product produced by the process of claim 1.

References Cited in the file of this patent

UNITED STATES PATENTS

| 1,869,657 | Bowers | Aug. 2, 1932 |
| 2,189,417 | Craig | Feb. 6, 1940 |
| 2,681,898 | Daly | June 22, 1954 |
| 2,766,219 | Beaver et al. | Oct. 9, 1956 |
| 2,798,860 | Hand et al. | July 9, 1957 |

OTHER REFERENCES

Neal et al.: Industrial and Engineering Chem., vol. 36, April 1944, pages 352–356.

India Rubber World, "Compounding Ingredients for Rubber," 2nd ed., 1947, Conway Printing Co., Inc., pp. 114 and 117.

The G.R.S. Manual, 1947, The Kynach Press, (Great Britain), pp. 79, 80 and 200.

Rao et al.: Industrial and Engineering Chem., vol. 44, March 1952, pages 576–580.

Wilson: "British Compounding Ingredients for Rubber," W. Heffer and Sons, Cambridge, England (1958), pages 172–173.